Jan. 9, 1940.  A. BERGER  2,186,748

HYDRAULIC TRANSMISSION FOR AUTOMOTIVE PURPOSES

Filed Aug. 19, 1937

INVENTOR:
ARTHUR BERGER
BY
ATTORNEY

UNITED STATES PATENT OFFICE 2,186,748

HYDRAULIC TRANSMISSION FOR AUTOMOTIVE PURPOSES

Arthur Berger, Oberturkheim, Germany, assignor to Daimler-Benz Aktiengesellschaft, Stuttgart-Untertürkheim, Germany Application August 19, 1937, Serial No. 159,859
In Germany August 20, 1935

8 Claims. (Cl. 60—54)

My invention relates to a hydraulic transmission for automotive purposes and, more particularly, to an improved combination therewith of the driving engine.

The main object of my invention is to provide simple and inexpensive means for maintaining the fluid-containing chambers of the hydraulic transmission in filled condition and to provide a cooling circuit therefor; I attain these and other objects to be discussed hereinafter by connecting the hydraulic transmission with the lubricating circuit of the driving engine and by providing a pump adapted to feed the lubricating fluid from the engine to the hydraulic transmission.

Viewed from another aspect, my invention resides in the provision of a circuit conducting the fluid to and from the transmission through a cooling device which may be the sump provided in the crank case of an internal combustion engine, and in the provision of two separate pumps one feeding fluid from the cooling device to the transmission and the other one feeding the fluid back from the transmission to the cooling device. The pump or pumps coordinated to the transmission are provided in addition to the lubricating pump of the engine and may be mounted on a common driving shaft together with the same. The pumps are suitably of the gear pump type.

It has been proposed prior to my invention to circulate the operating fluid to and from a hydraulic transmission but in this prior proposal the transmission was of the large stationary type. I have found it highly desirable, however, to apply the same improvement to small transmissions for automotive purposes, for instance in automobiles or air craft, as the continuous dissipation of heat by the circulation of the fluid to and from the transmission will enable the latter to transmit a higher power at a higher speed or to reduce the dimensions and the weight of the transmission for a given power output.

Experience has proved that a power plant equipped with the improvements above described may readily produce a speed of 24,000 R. P. M. without becoming unduly heated. Therefore, the invention is primarily applicable to power plants of the type where the engine is geared to a rotary compressor by means of a hydraulic transmission. By combining the fluid circuit of the transmission with the lubricating circuit of the engine I have been able to provide a very effective and inexpensive circulating arrangement for the transmission which will add very little weight to the power plant and has proved highly efficient in operation.

The transmission may be of any desired type. It may reduce or increase the speed or it may act as a simple clutch without changing the speed. It may connect the engine with auxiliary equipment such as a compressor or it may be used to transmit the power from the engine to the propelling means, for instance the wheels of an automobile.

The provision of a separate pump adapted to feed fluid from the engine to the transmission provides a possibility of temporarily disabling the driving connection between the compressor and the engine of a racing car or an aeroplane by emptying the transmission in a simple manner and by refilling it by means of the pump.

The coordination, in addition to the lubricating pump, of one or more separate gear pumps to the transmission circuit, feeding a definite amount of fluid through the latter avoids the dependence of the fluid circulation upon the quality, more particularly, the viscosity of the lubricating fluid at varying temperatures.

The advantages obtained by the provision of one or more special gear pumps filling the transmission arrangement in the pressure conduit of the pump for the lubricating circuit are of different kind. On the one hand the oil is pressed from the lubricating pump to one or more pumps for filling the transmission, so that always, independently of the temperature and viscosity of the oil, a sufficient quantity of transmission fluid is guaranteed. On the other hand the special gear pump or the pumps for the transmission work as a dosing or metering arrangement because it takes away from the lubricating circuit only a predetermined quantity of oil, which depends upon the capacity of the gear pump, so that the quantity of oil necessary for the engine lubrication is always guaranteed.

Further objects of my invention will appear from the description following hereinafter and the features of novelty will be pointed out in the claims.

In the drawing, various different embodiments of my invention are illustrated.

Figure 1:
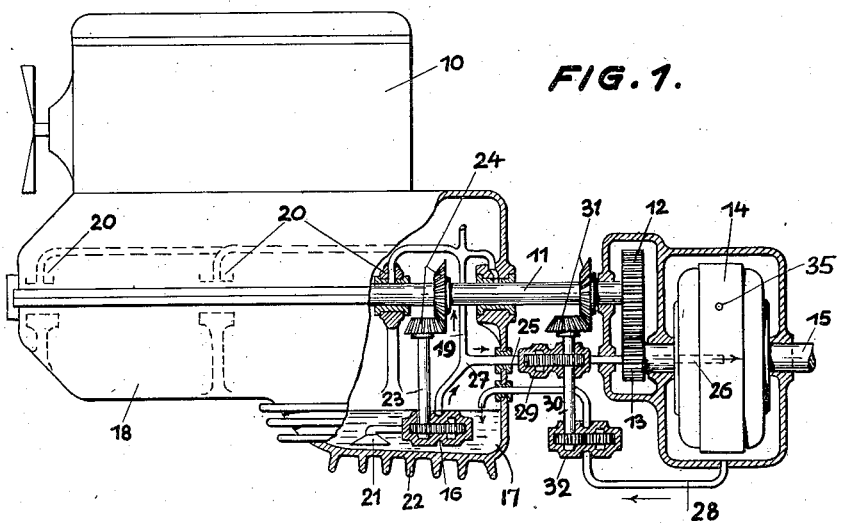
Fig. 1 is an elevation of an internal combustion engine and the transmission connected therewith, partly shown in a vertical section, the fluid circuit of the transmission being branched off from the lubricating circuit of the engine.

With reference to Fig. 1 it will be noted that the internal combustion engine 10 is connected through its drive shaft 11 and a pair of spur gears 12, 13 with a hydraulic transmission 14, the driven shaft 15 of which may drive a compressor or supercharger, not shown, which cooperates with the engine 10.

The transmission 14 is preferably of the hydrodynamic type and the compressor of the rotary type requiring a very high speed of rotation. The driving shaft 26 of the transmission to which the gear 13 is attached may rotate at the same speed as shaft 15, the transmission acting as clutch only, or it may rotate at a different speed, the transmission acting as a speed change gear.

Alternatively, the shaft 15 of the transmission 14 may drive the propelling means, for instance the wheels of an automobile.

A gear pump 16 mounted within the sump 17 provided for in the crank case 18 of the engine circulates the lubricating fluid through a conduit 19 to a plurality of bearings diagrammatically indicated at 20, and thence back to the sump 17 wherefrom the liquid is admitted to the pump 16 again through an intake pipe 21. In order to cool the oil in the sump 17, the crank case 18 is provided with ribs or fins 22 near its bottom which dissipate the heat. The pump 16 is of the gear type comprising two meshing gears closely encased by a housing which communicates with the intake pipe 21 and the feed pipe 19 at opposite points. One of the gears is mounted on a shaft 23 which is driven from the shaft 11 by a pair of bevel gears 24.

In order to keep the transmission 14 in filled-up condition, I have provided a conduit adapted to feed fluid from the sump 17 to the transmission 14. This conduit is indicated at 25. It connects a point 27 in the lubricating circuit with the transmission. The point 27 is located near the exhaust of the pump 16 so that the pressure created by the pump is operative to feed the lubricating fluid forcibly from the sump through the pump 16, the lower section of conduit 19 and the conduit 25 to the transmission 14 to keep the same always completely filled up.

The conduit 25 may be partly formed by an axial bore provided for in the shaft 26.

In order to cool the transmission fluid, I have provided a return conduit 28 leading from the transmission 14 to the sump, thus circulating fluid continuously from the transmission back to the sump 17 where it is cooled by the dissipation of heat through the ribs 22. Therefore, the sump 17 constitutes a cooling device. The excess fluid from the transmission 14 passes through the throttle opening 35 and thence to the return conduit 28. While I prefer to use the crank case of the engine as such a cooling device, I wish it to be understood that some features of my invention are applicable to an arrangement where the cooling device is distinct from the sump of the engine.

According to this invention a second pump 29 is positioned in the pressure conduit of the lubricating pump 16, this second pump acting to take the oil or other fluid from the first pump and draw it through the conduit 25 under pressure. The pump 29 then presses the fluid through the conduit 26 into the working spaces of the hydraulic coupling 14. The use of a second pump 29 has the advantage that the necessary working fluid for the driving of the hydraulic coupling is assured under all circumstances. The lubricating pump 16 is designed to have such a capacity that it is able to supply sufficient fluid for the lubricating points 20 and for the fluid transmission 14, pumping a part of the fluid to the pump 29. This pump 29 has, therefore, primarily the function of a metering pump which on the one hand assures a sufficient amount of fluid for the hydraulic transmission and on the other hand does not draw from the lubricating conduit 19 so much oil that the lubricating of the bearing points 20 is adversely affected. By forming the metering pump 29 as a gear wheel pump, a definite quantity of fluid is transmitted depending upon the space between the gear teeth and the speed of rotation. This quantity is independent of the viscosity of the fluid which as is well known, changes with temperature.

I have found it desirable under certain circumstances to insert a similar gear pump 32 in the return conduit 28. In this manner, a positive circulation of the fluid from the transmission to the cooling device and back to the transmission is ensured. Preferably, the pumps 29 and 32 or all of the three pumps 16, 29 and 32 are mounted on the same shaft. Therefore, the pump 32 is mounted on shaft 30 in the embodiment shown in Fig. 1.

Figure 2:
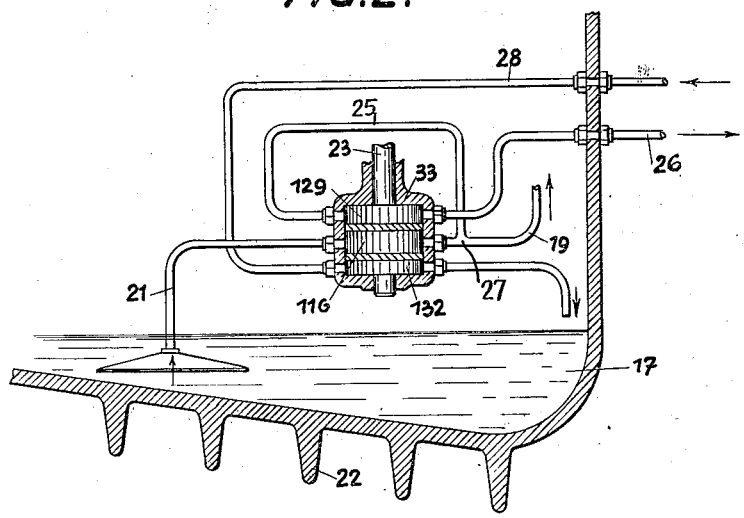
Fig. 2 is a vertical section through a modified embodiment similar to that of Fig. 1 but differing therefrom by a re-arrangement of the three pumps.

In Fig. 2, all of the three pumps indicated at 129, 116 and 132 corresponding to the pumps 29, 16 and 32 of Fig. 1 are mounted on the shaft 23 and are encased in a common housing 33 to form a unitary structure with each other. In this event, the shaft 30 and the bevel gears 31 are dispensed with.

It will be obvious to those skilled in the art that while my invention has been described above as pertaining to an automotive engine, it will, under many circumstances, be applicable to any prime mover used as a source of power for any device wherein it is desirable to include a fluid transmission therebetween.

My invention is not limited to the exact details of the construction shown but includes such variations and modifications as come within the scope of the appended claims.

What I claim is:

1. The combination comprising a prime mover including a source of lubricating fluid and a lubricating circuit communicating therewith, a hydraulic transmission connected with said prime mover, a conduit adapted to feed fluid from said source to said lubricating circuit and said transmission, a constant-volume pump inserted in said conduit and adapted to supply said lubricating circuit and said transmission with fluid, and a metering device intermediate said conduit and said hydraulic transmission for controlling the flow of fluid thereto.

2. The combination comprising a prime mover including a source of lubricating fluid and a lubricating circuit communicating therewith, a hydraulic transmission connected with said prime mover, a conduit adapted to feed fluid from said lubricating circuit to said transmission, two pumps, one inserted in said circuit to secure lubrication of said prime mover and the other one inserted in said conduit and adapted to supply said transmission with fluid to maintain the filled condition thereof, and gearing means establishing driving connections between said prime mover and said pumps.

3. The combination comprising a prime mover including a source of lubricating fluid and a lubricating circuit communicating therewith, a hydraulic transmission connected with said prime mover, a conduit adapted to feed fluid from said lubricating circuit to said transmission, two pumps, one inserted in said circuit to secure lubrication of said prime mover and the other one inserted in said conduit and adapted to supply said transmission with fluid to maintain the filled condition thereof, and a common casing for said pumps.

4. The combination comprising a prime mover including a source of lubricating fluid and a lubricating circuit communicating therewith, a hydraulic transmission connected with said prime mover, a conduit adapted to feed fluid from said lubricating circuit to said transmission, two pumps, one inserted in said circuit to secure lubrication of said prime mover and the other one inserted in said conduit and adapted to supply said transmission with fluid to maintain the filled condition thereof, a gearing establishing a driving connection between said prime mover and said pumps, and a common casing for said pumps.

5. The combination comprising a prime mover including a lubricating circuit and a source of lubricating fluid communicating therewith, a hydraulic transmission, a pump circulating lubricating fluid from said source through said circuit, a conduit connecting a point in said circuit near the exhaust of said pump with said transmission to maintain the same in filled condition, a second pump inserted in said conduit, a shaft geared to said prime mover and adapted to drive both of said pumps, and a common casing for said pumps.

6. The combination comprising a prime mover, a hydraulic transmission, means establishing a driving connection therebetween, a source of lubricating fluid, a lubricating conduit in said prime mover communicating with said source, a lubricating pump inserted between said source and said lubricating conduit, a second conduit branched off from said lubricating conduit and leading to said transmission to keep the fluid therein under the pressure produced by said lubricating pump, a return conduit connecting said transmission with said source, two pumps one inserted in said second conduit and the other one in said return conduit, and means gearing all of said pumps to said prime mover to positively circulate the fluid through said transmission and to keep the same under pressure therein.

7. The combination comprising a prime mover, a hydraulic transmission, means establishing a driving connection therebetween, a source of lubricating fluid, a lubricating conduit in said prime mover communicating with said source, a lubricating pump inserted between said source and said lubricating conduit, a second conduit branched off from said lubricating conduit and leading to said transmission to keep the fluid therein under the pressure produced by said lubricating pump, a return conduit connecting said transmission with said source, two pumps one inserted in said second conduit and the other one in said return conduit, and a single shaft geared to said prime mover and driving all of said pumps to positively circulate the fluid through said transmission and to keep the same under pressure therein.

8. In combination, a prime mover having a source of lubricating fluid, a pumping unit including three gear pumps having a single shaft drivably connected to said prime mover, conduits forming a lubricating circuit for said prime mover and connected to said source through one of said pumps, a hydraulic transmission drivably connected with said prime mover, a supply conduit leading from said lubricating circuit to said hydraulic transmission, and a return conduit leading from said hydraulic transmission to said source, the two remaining pumps being included, one in each of said last conduits to positively circulate the fluid to and from said hydraulic transmission.

ARTHUR BERGER.